United States Patent [19]
Braun

[11] 3,944,299
[45] Mar. 16, 1976

[54] MACHINE BEARING CONSTRUCTION AND ARRANGEMENT

[76] Inventor: Anton Braun, 6421 Warren Ave., Minneapolis, Minn. 55435

[22] Filed: Feb. 21, 1975

[21] Appl. No.: 551,771

[52] U.S. Cl. .................................. 308/3 CH; 74/44
[51] Int. Cl.² ......................................... F16C 33/20
[58] Field of Search ...... 308/3 R, 3 CH, 2 R; 74/44, 74/29; 92/128, 138; 417/534; 123/56 AC

[56] References Cited
UNITED STATES PATENTS

| | | | |
|---|---|---|---|
| 2,328,918 | 9/1943 | McManus | 308/3 CH X |
| 3,861,222 | 1/1975 | Braun et al. | 74/44 |

*Primary Examiner*—M. H. Wood, Jr.
*Assistant Examiner*—Gene A. Church
*Attorney, Agent, or Firm*—Alan M. Staubly

[57] ABSTRACT

A machine, such as the compressor, having a housing formed in two sections. One section encloses a working unit while the second section encloses a driving unit for operating the working unit. A connector unit in the second section is operably connected by removable bearing means to the working unit and to the driving unit. The connector unit has pivoted bearings thereon that are slidable on mating removable bearings on the housing. A window is provided in the second section, through which window all of the bearing means in the second section may be removed without disturbing the working unit in its section. The pivoted bearings are of the so called Mitchell type but are of an improved construction. The bearing surfaces thereof have one or more transverse grooves therein that are symetrically arranged with respect to a plane passing through the pivot bore and perpendicular to the bearing's face. This construction tends to prevent digging in of the bearing when moving along the mating bearing.

12 Claims, 7 Drawing Figures

MACHINE BEARING CONSTRUCTION AND ARRANGEMENT

It is common practice in the machine art to provide a crosshead with a bearing surface between a connecting rod of a power unit and an axially reciprocable energy absorbing unit in an energy absorbing device, such as illustrated in my U.S. Pat. No. 3,861,222. It is also common practice to provide openings in the housing for such machines to provide access to bearings for inspection and lubrication purposes. In U.S. Pat. No. 2,328,918, a crosshead for an engine is shown that has rollers pivoted at its edges for rolling back and forth in channel shaped guides.

This invention lies in an improved slidable bearing and in a machine of the above mentioned type wherein all of the components or units in the machine's housing and all of the bearings for such components or units, are so constructed and arranged in the machine's housing as to enable them to be removed through an opening or openings in side walls of the machine's housing without having to dismantel or disconnect the energy absorbing unit or device.

One of the bearings is of the Mitchell type but with an improved construction. By providing at least one transverse groove in its slidable surface in line with the pivot and/or pairs of grooves equally spaced from the pivot, the resultant of the moments of the forces acting normal to the surface of the bearing, when the bearing is moving over a mating bearing surface in the housing, tends to lift the leading edge of the moving bearing so as to prevent it from tending to dig into the mating surface. In the instant preferred arrangement, a pair of slidable bearings are located at opposite sides of the lower portion of a coupling means, with the upper portion thereof operably connected to the energy absorbing device and being permitted to float transversely of the axis of movement and thus avoid any binding action. It also eliminates the need for a separate crosshead to receive the normal force components of the connecting rod.

The use of pivoted bearings that slide on mating bearing surfaces has been found to be superior to the roller bearing arrangement of the second mentioned patent when used on a reciprocating member. The inertia of the roller prevents quick reversal and therefore causes the rollers to slide and wear flat surfaces thereon, destroying their effectiveness. The present invention overcomes this long standing problem.

FIG. 1 of the drawing is a schematic and cross-sectional view of a machine embodying the invention;

Figure 1:
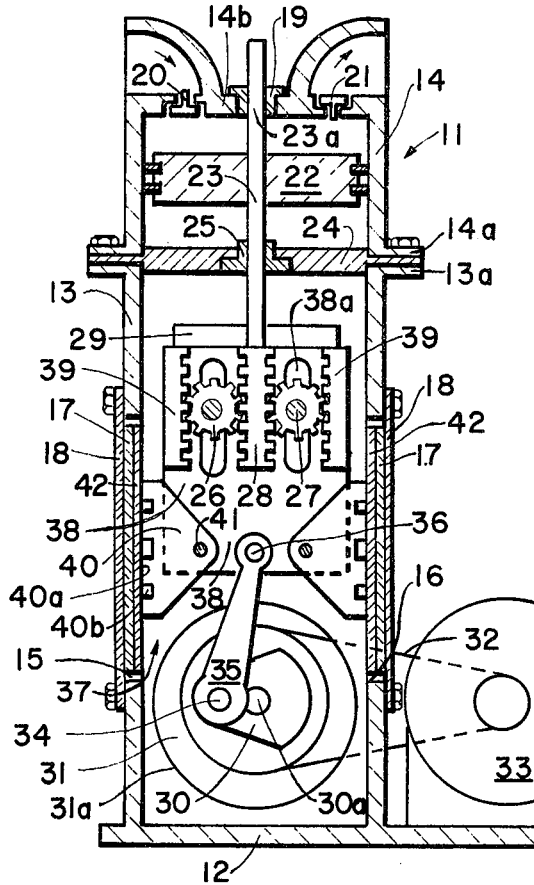

In FIG. 1 of the drawing, the reference numeral 11 generally designates the housing of a machine having a base 12, a bottom section 13 and a top or working section 14. The section 13 has two side openings 15 and 16 which are covered by plates 18 with shims 17. The upper end of section 13 has an outwardly extending flange 13a extending around the outer surface thereof.

The upper section has an end wall 14b with a bearing 19 therein. Wall 14b also has an air inlet check valve 20 and an air outlet check valve 21 therein. A compressor piston 22 is located in section 14 and has a rod 23 that extends into section 13. A rod extension 23a is located in bearing 14c to help guide piston 22.

A plate 24 is secured between the lower flange 13a and the upper flange 14a by means of bolts and carries a bearing 25 centrally thereof through which piston rod 23 extends. Two spaced gears 26 on pivot pins 27 are suitably fixed in the housing. Extending between and meshing with the gears is a double rack member 28 which is threaded or otherwise connected to the end of rod 23. To provide access to the pins 27 for assembly or disassembly purposes, there are oppositely disposed and preferrably covered openings 29 in section 13.

Located in the lower portion of section 13, is a balanced crank 30 mounted on a bearing support plate 31 covering an opening 31a. Mounted on crankshaft 30a, externally of the housing, is a pulley (not shown) that is connected by a belt 32 to a power unit 33 on base 12. The unit 33 may be an electric motor or any other suitable power generating device. A crank pin 34 connects the crank to the lower end of a connecting rod 35 while a pivot pin 36 connects the upper end of the connecting rod to coupling member or unit 37.

The coupling unit has two spaced plates 38 with two inwardly facing racks 39 secured therebetween and with the teeth thereon engaging the teeth on the adjacent gears 26, as more fully described in the above mentioned U.S. Pat. No. 3,861,222. Slots 38a in the plates straddle pins 27 to permit reciprocating movement of the plates in the housing. Located at the lower side edges of unit 37 are two slidable bearing members or shoes 40 on pivot pins 41 extending between plates 38, substantially in transverse alignment with pivot 36. A bearing face 40a on each shoe engages through a film of lubricant (not shown) a bearing plate 42 suitably mounted on each of cover plates 18 with shim plates 17 therebetween. The surface of each of the shoes preferably has at least one transverse groove 40b. If only one transverse groove is used it should be centered on a plane extending through the axis of pin 41 in the shoe and perpendicular to the bearing surface of the shoe. If more than one transverse groove is used, they should all be symetrically arranged with respect to said plane.

Figure 2:
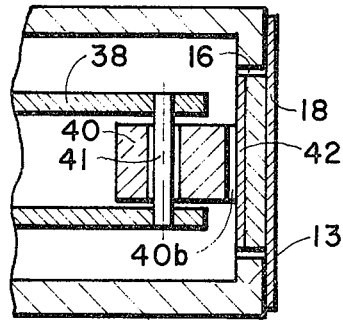
FIG. 2 is a slightly enlarged fragmentary sectional view taken along line 2—2 of FIG. 1.
Figure 3:
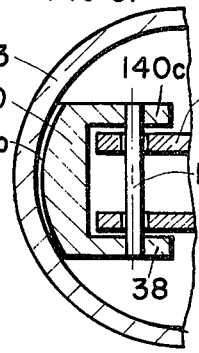
FIG. 3 is a slightly enlarged fragmentary sectional view of a modification of the slidable bearing.

The modification of FIG. 3 differs from that of FIGS. 1 and 2 in that the lower section and/or a liner 113 therein is round and the face of shoe 140 is curved to fit the inner surface of 113. Also the shoes have side walls 140c that straddle the plates 38. It is also preferable to have a transverse groove 140b in the surface of these shoes.

Figure 4:
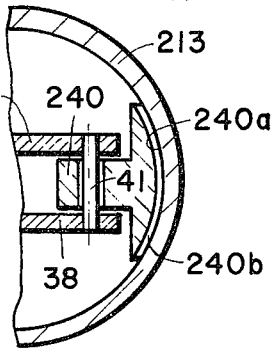
FIG. 4 is a view similar to that of FIG. 3 of another modification of the bearing.

The modification of FIG. 4 is similar to that of FIG. 3 except that it has only one inwardly extending wall 240c pivoted on pin 41 between the plates 38 and similar grooves 240b.

Figure 5:
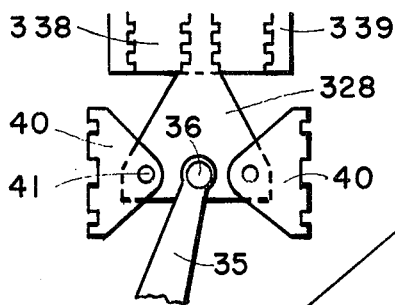
FIG. 5 is a fragmentary view of a modified bearing arrangement.

In FIG. 5, the piston 22 and rod 23 are connected to central rack member 28 which is directly connected to pin 36 by means of extension or member 328 and the shoes 40 are mounted on the sides of member 328. In this case, 339 is merely a counterweight.

Figure 6:
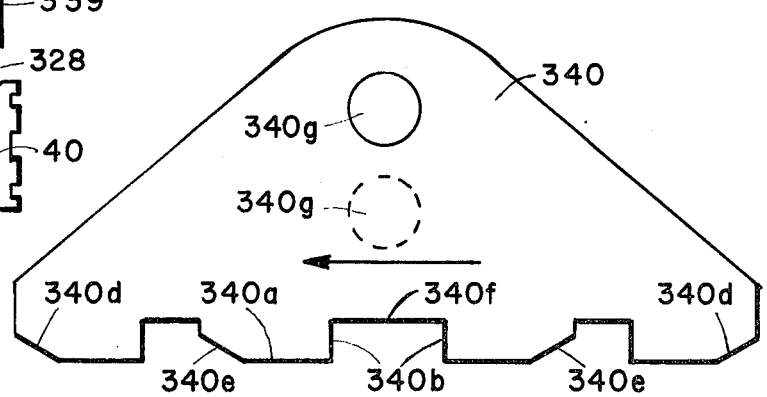
FIG. 6 is an enlarged side elevational view of a slightly different version of the slidable bearing of FIG. 1.

The modification in FIG. 6 disclosed generally the same shoe as that illustrated in FIG. 1 and is preferable thereto in that the ends of the shoe are beveled or inclined at 340d and the inner edge of each transverse groove, except the wider central groove 340b, is also beveled as shown at 340e. The beveled surface causes the following land surface to plane up onto the oil between it and bearing plate 42. Also, a hole 340g is shown in an alternate dotted line position as being approximately at the center of the mass of the shoe as well as centrally of the ends of the shoe. In this position the moments of force due to the weight distribution of the shoe and the acceleration and deceleration of the shoe will be balanced out even though the hydrodynamic forces acting on the shoe bearing surfaces are normally enough to overbalance the shoe's weight.

Figure 7:
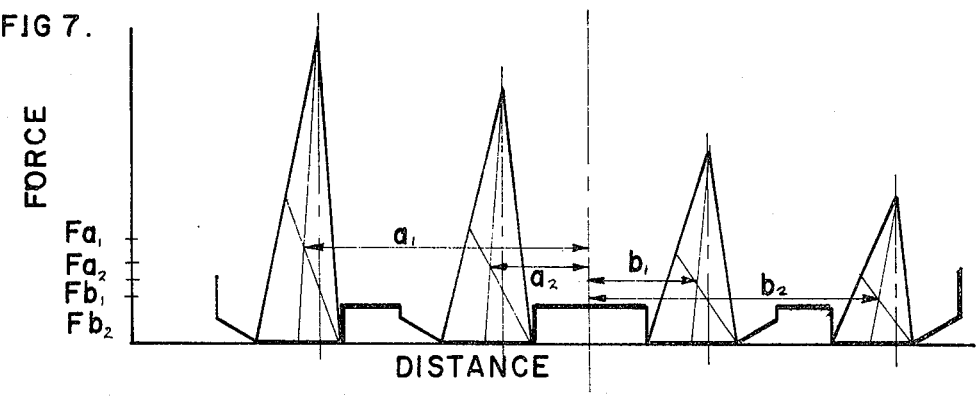
FIG. 7 is a graph of the forces acting on the lands of the bearing of FIGS. 1 and 6 when the bearing is in motion.

The graph of FIG. 7 shows the location and the approximate distribution and relative sizes of the forces that build up against the lands between the grooves when the shoe is moving to the left, as illustrated in FIG. 6. It is to be noted that the greatest or peak forces on the various lands of the bearing surfaces exist on the left or "forward" lands because of the action of the leading edges during movement to the left, while the right or trailing lands have lower forces because of the scraping action of the sharp "forward" edges on the trailing lands. In other words, the forces on each of the lands are unsymetrical (as approximated by the acute-angled triangles shown) and the moments of forces thus acting around each of the shoe's pivots is expressed by the formula $$\sum_1^n F_{a_i} \cdot a_i > \sum_1^n F_{b_i} \cdot b_i,$$

where $n$ is the number of centers of force on each side of the shoe's pivot, $F_a$ and $F_b$ are the resultant forces on the leading and the trailing lands and $i$ is a subscript which takes values from "1" (one) to $n$ depending on the number of outer grooves. When the direction of the shoe's movement is reversed, the leading edges will be reversed and the force locations will reverse, as will the moments of force. As illustrated, the center of the force areas will be approximately one third the peak heights and will lie on a line through the center of each land surface and the peak force in the force area. According to the above formula then and as shown in FIG. 6 with shoe 340 moving to the left the moments of force will tend to rotate the shoe clockwise to help prevent the leading edge of the shoe from digging into the mating bearing surface. By further increasing the number of transverse grooves, a still further unbalance of the moments of force will result, giving an increased lifting effect to the leading edge.

From the above description it is apparent that when the power unit 33 is operating, the crank will cause the coupling unit to move up and down, with the shoes sliding along the mating bearing plates 42. Since the gears 26 engage the inner and outer racks, the piston will always move in the opposite direction to the coupling unit 37 and impart a reciprocating and, therefore, a pumping operation to the piston 22.

Should it ever be necessary to replace any of the components, units or bearings in the machine housing 13, it is only necessary to remove one or more of the cover plates 18, covers (not shown) over openings 29, and/or bearing support plate 31. Any bearing may thus be made available for removal and all detachable elements in the lower section may be removed through the openings without having to dismantel or otherwise work on the upper or working portion of the machine. Especially in machines of the type described but with a more normal crosshead arrangement it is also contemplated within the spirit of the invention, that the opening 31a may be large enough as shown in dotted lines in FIG. 1 and/or the coupling unit 37 be made small enough that all of the detachable elements in the lower section may be removed through that opening rather than through opening 15 or 16 which may not be necessary in such versions.

It is further understood that the bearing construction and arrangement applies equally as well to a machine wherein the piston 22 and the chamber it is located in are parts of a combustion engine and the crankshaft 30a is a power shaft for driving a generator or some other energy absorbing device.

I claim:

1. In a machine having a reciprocable member therein, a bearing for said member comprising a slidable member with pivot means disposed substantially centrally of its ends and having a bearing surface elongated in the direction it moves for engaging a mating fixed surface in the machine, said elongated surface having at least one transverse groove therein concentric with respect to a plane through the center of the pivot means and perpendicular to the bearing surface to cause the moments of force acting thereon about its pivot when in motion to cause the leading end thereof to tend to lift off of the mating surface.

2. A bearing as defined in claim 1 wherein the center of mass of the bearing is substantially on the axis of the pivot means.

3. A bearing as defined in claim 1 wherein there are more than one transverse groove and the ends of the bearing and the inner edge of each complete groove between the pivot means and each end of the bearing are beveled.

4. In a machine having a reciprocable member therein, an energy-absorbing device operably connected to one end of said member and power means operably connected to the other end thereof, slidable bearing means for said member comprising a pair of bearing members with one at each side of said reciprocable member pivotally connected thereto near the connection between said reciprocable member and one of said energy absorbing device and said power means, said bearing members being adapted to engage a pair of diametrically opposed and mating surfaces in the machine so as to guide the lower end of said reciprocable member during its reciprocating movement.

5. Bearing means as defined in claim 4 wherein each of said pivoted members have an elongated bearing surface with at least one transverse groove centrally therein for sliding on its mating surface.

6. Bearing means as defined in claim 5 with said bearing surface having additional groups of grooves symetrically located with respect to the center line of said pivot means.

7. Bearing means as defined in claim 4 wherein said reciprocable member embodies a motion reversing mechanism.

8. A machine comprising a housing, an energy absorbing device having a driven member thereof reciprocably mounted therein, a first bearing means detachably mounted in said housing for guiding said member, power driven means detachably mounted in a second bearing means in said housing in spaced relationship with respect to said member, coupling means between said member and said power driven means, third bearing means on said coupling means, and mating fourth bearing means in said housing for engagement by said third bearing means for guidance by said mating means and at least one opening in a side wall of said housing that is large enough to permit the removal of all of said bearing means and other detachble elements in said housing.

9. A machine as defined in claim 8 wherein there is at least one cover for said opening in said housing and at least one at said fourth bearing means positioned thereon.

10. A machine as defined in claim 8 wherein one of said power driven means and driven members of said energy absorbing device includes a crankshaft that has a pin thereon that is connected to said coupling means by a connecting rod.

11. A machine as defined in claim 8 wherein said coupling means has a motion reversing mechanism for causing substantially half of the axially moving masses therein to move simultaneously in the opposite direction from the other half of the moving masses.

12. A machine as defined in claim 8 wherein said housing includes a plurality of parts secured together and has coupling means for connecting it to other devices.

* * * * *